United States Patent [19]

Rourk

[11] Patent Number: 5,227,942
[45] Date of Patent: Jul. 13, 1993

[54] STRUCTURE AND METHOD FOR DISTRIBUTING FAILURE-INDUCED TRANSIENT CURRENTS IN A MULTIPHASE ELECTRICAL MACHINE

[75] Inventor: Christopher J. Rourk, Oviedo, Fla.

[73] Assignee: Westinghouse Electric Corp., Pittsburgh, Pa.

[21] Appl. No.: 702,560

[22] Filed: May 20, 1991

[51] Int. Cl.⁵ .................... H02H 7/085; H02K 11/00
[52] U.S. Cl. ......................................... 361/20; 361/23; 310/68 D
[58] Field of Search ............... 361/20, 23, 47, 104; 310/68 B, 68 C, 68 D, 68 R

[56] References Cited

U.S. PATENT DOCUMENTS

| | | | |
|---|---|---|---|
| 3,348,127 | 10/1967 | Petersen | 322/59 |
| 3,705,331 | 12/1972 | South et al. | 361/20 |
| 4,486,801 | 12/1984 | Jackovich et al. | 361/21 |
| 4,559,486 | 12/1985 | Spencer et al. | 322/49 |
| 4,595,965 | 6/1986 | Glennon | 361/20 |
| 4,635,045 | 1/1987 | Miller et al. | 340/638 |
| 4,952,915 | 8/1990 | Jenkins et al. | 340/639 |

Primary Examiner—A. D. Pellinen
Assistant Examiner—Ronald W. Leja
Attorney, Agent, or Firm—M. G. Panian

[57] ABSTRACT

An auxiliary stranded copper conductor carries the fault currents generated by a diode failure about the periphery of a brushless exciter diode wheel. The auxiliary conductor is constructed with a lower high-frequency impedance than the adjacent diode wheel, so that AC fault currents in particular are diverted to the auxiliary conductor. The auxiliary conductor carries the fault currents to equalize both AC and DC fault currents among the fuse-legs of the same phase. In a preferred embodiment, the auxiliary conductor is circular and is mounted between all of the diode fuse bases at one end of the diode wheel and the diode wheel itself.

30 Claims, 3 Drawing Sheets

STRUCTURE AND METHOD FOR DISTRIBUTING FAILURE-INDUCED TRANSIENT CURRENTS IN A MULTIPHASE ELECTRICAL MACHINE

FIELD OF THE INVENTION

The present invention is directed generally to a structure and method for conducting and distributing transient currents which are present upon failure of a component in a multiphase electrical machine, and more particularly to an auxiliary peripheral current conductor for a brushless exciter diode wheel.

BACKGROUND OF THE INVENTION

There are many kinds of multiphase electrical machines having rotating members which carry electrical components and include a cylindrical conductor. One example of such a rotating member is a brushless exciter. The major structural component of a brushless exciter is typically a rotating cylindrical conductor made from magnetic steel and known as a diode wheel. The basic function of a brushless exciter is to generate an alternating current and convert that current into a direct current used to produce the rotating field for an electrical generator. Rectification is accomplished through the use of multiple diode circuits which are rigidly mounted to the diode wheel. For a three-phase wye system a minimum of six diodes is required. Typically, however, many more are used to provide spare legs, to accommodate multiple pole designs, and to provide high current carrying capacity. Where high current capabilities are needed, many diodes are connected in parallel to reduce the current flow through each diode. To protect such diodes from degradation due to overcurrent application, and to protect the exciter's operation from the effects of a shorted diode, designs typically include fuses connected in series with the diodes about the periphery of the diode wheel.

In brushless exciter designs that include many diode-fuse combinations in parallel, the failure of a single diode should not have an adverse effect on the remaining diode-fuse combinations. Although each of the remaining parallel fuses will be required to carry an increased current load, this current is usually within the design capability of the fuse. In recognition of this fact, a number of systems have been proposed for detecting single diode failures which have not resulted in a shutdown of the generator. Such systems are illustrated in U.S. Pat. Nos. 4,635,045, and 4,952,915, assigned to the assignee of the present invention.

In practice, however, it has been observed that a single fuse failure in a brushless exciter design which utilizes phase paralleling rings has the potential to cause a cascade failure of the other diode fuses, resulting in a forced outage of the exciter (and the generator). Therefore, there is a need for a design which prevents overload of adjacent diode fuses resulting from failure of another diode fuse, thus preventing unnecessary cascade failures and generator shutdown.

SUMMARY OF THE INVENTION

Therefore, it is a general object of the present invention to provide a system and method for equalizing high-frequency current flow in an electrical machine.

Another general object of the present invention is to provide a system and method for preventing cascade failures of fuses in a brushless exciter.

Another general object of the present invention is to provide a system and method for equalizing fault currents in a brushless exciter.

A more specific object of the present invention is to provide a structure for connecting a plurality of current conductors to a rotating cylindrical direct current conductor in an electrical machine, including an auxiliary conductor with an impedance lower than that of the cylindrical current conductor.

A further object of the present invention is to provide a circular conductor to distribute fault currents among connections to an electrical machine component.

Yet another object of the present invention is to provide a structure for connecting a plurality of conductors to a cylindrical conductor, including an auxiliary conductor which is stranded to reduce high-frequency impedance.

Another object of the present invention is to provide a structure for connecting a plurality of conductors to the cylindrical diode wheel of an electrical machine, including an auxiliary conductor which is connected between a group of diode fuses and the cylindrical diode wheel.

A further object of the present invention is to provide a structure for connecting a plurality of conductors to the cylindrical diode wheel of an electrical machine, including an auxiliary conductor which is connected between a group of diode fuses and the cylindrical diode wheel and which is mounted in position using the mounting hardware of the diode fuses.

These objects and others are achieved in the present invention by providing an auxiliary stranded copper conductor which carries the fault currents generated by a diode failure about the periphery of a brushless exciter diode wheel. The auxiliary conductor is constructed with a lower high-frequency impedance than the adjacent diode wheel, so that high frequency fault currents in particular are diverted to the auxiliary conductor. The auxiliary conductor carries the fault currents to equalize these high frequency fault currents among the fuse-legs of the same phase. In a preferred embodiment, the auxiliary conductor is circular and is mounted between all of the diode fuse bases at one end of the diode wheel and the diode wheel itself.

DETAILED DESCRIPTION OF THE INVENTION

In its broadest application, the present invention is applied to a multiphase electric machine having a rotating cylindrical conductor with a plurality of current-carrying conductors attached thereto, generally at spaced locations about the periphery of the cylindrical conductor. In the illustrative embodiment disclosed herein, the invention is described in conjunction with a brushless exciter. However, those skilled in the art will recognize that the principles of the present invention may be applied to any generally cylindrical conductor of an electric machine.

Figure 1:
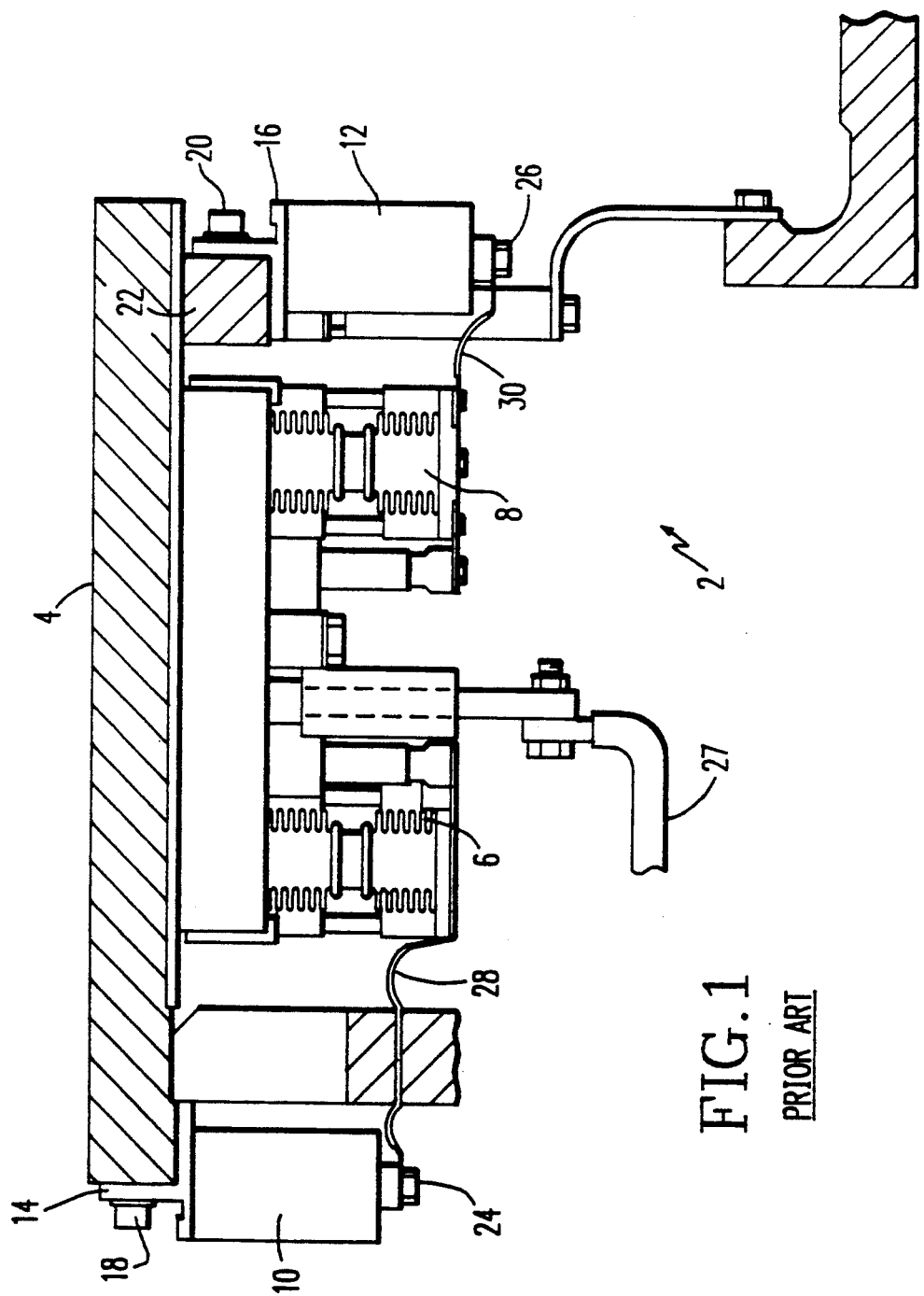
FIG. 1 is a partial sectional view of a typical prior art brushless exciter rotor assembly showing the connections of diodes and diode fuses to the diode wheel.

A typical rotating portion 2 of a brushless exciter is shown in partial cross-section in FIG. 1. Although the construction of brushless exciters is well-known in the art, the rotating portion 2 will be described briefly herein to facilitate ready understanding of the present invention by those who are less familiar with the art.

As shown in FIG. 1, the rotating portion 2 comprises a diode wheel 4, diode assemblies 6 and 8, diode fuses 10 and 12 corresponding to each diode assembly 6 and 8, fuse attachment bolts 18, 20, 24, and 26, and fuse mounting block 22. The diode fuses 10 and 12 include fuse bases 14 and 16 respectively. The diode wheel 4 is a generally cylindrical wheel which rotates about its central longitudinal axis (not shown) and is constructed of magnetic steel. Diode assemblies 6 and 8 are mounted on the inside of diode wheel 4. Diode fuses 10 are mounted on one end of the diode wheel 4 about its periphery, where they are held in place by fuse attachment bolts 18 which mount the fuse bases 14 to the diode wheel 4. Diode fuses 12 are mounted at the other end of the diode wheel 4 about its periphery and are held in place by fuse attachment bolts 20 which mount their fuse bases 16 to the fuse mounting block or blocks 22. Conductors 28 and 30 connect diode assemblies 6 and 8 to diode fuses 10 and 12 by means of fuse attachment bolts 24 and 26 respectively. The diode fuses 10 and 12 interrupt the flow of current from a particular diode assembly 6 or 8 in case of failure of that diode assembly.

Although shown here in cross-section, so that only one of each component is shown, it will be recognized that the diode wheel 4 is of generally cylindrical shape, and that a plurality of each of the other components shown are carried in spaced relationship about the inside of the diode wheel 4. Generally, the number of diode assemblies 6 and 8 depends on the number of phases and the current-carrying capacity provided in the design of the brushless exciter. Typically, in a three-phase design, there might be six groups of four diode assemblies 6 and 8 arranged in parallel within the groups. The components described may be arranged on one or both ends of the rotating portion 2. In the illustration diode assemblies 6, 8 and diode fuses 10, 12 are arrayed on both ends of the rotating portion 2. In this design, a plurality of diode assemblies 6 and diode fuses 10 are spaced about the periphery of diode wheel 4, located in respectively common vertical planes at the left end of the rotating portion 2 as shown. A plurality of diode assemblies 8 and diode fuses 12 are spaced about the periphery of diode wheel 4, located in respectively common vertical planes at the right end of the rotating portion 2 according to its orientation in the drawing figure.

The diode assemblies 6 and 8 receive an alternating current input from windings (not shown) through phase leads 27. This current input is received at any one of the diode assemblies 6 and 8 only periodically during rotation of the machine in a manner which is well known in the art. In general, the length of the period during which a given diode conducts depends on the number of diode groups and the number of phases in the machine design. The timing of the current input depends on the diode location and on which phase is associated with the diode. The diode assemblies 6 and 8 rectify the alternating current input to produce a chopped alternating current output which is transmitted through conductors 28 and 30 respectively to the diode fuses 10 and 12 respectively. This chopped alternating current output passes through fuse bases 14 and 16 to diode wheel 4 and fuse mounting block or blocks 22 respectively. The sum of all chopped alternating currents which lead to the diode wheel is a DC current, which flows axially through the wheel. The direct current output is then collected and transmitted to a field winding which is to be energized in a manner which is well-known.

The present invention is a method and structure which channels fault currents developing upon the failure of a diode assembly 6 or 8 to prevent damage to other components and undesired shutdown of the machine. Under normal operation, currents in the diode wheel 4 are DC currents, and the magnetic steel material of the diode wheel 4 does not develop an inductive reactance. The diode assemblies 6 and 8 each have essentially the same impedance, and no current imbalance exists between phases.

When a brushless exciter diode such as diode assemblies 6 and 8 fails, it short-circuits, causing a current from all active diode-fuse legs of another phase to flow circumferentially around the periphery of the diode wheel 4 and thus feed the short circuit. The excess current condition thereafter actuates the diode fuse 10 or 12 associated with that diode assembly 6 or 8. The changes in current paths and reversals in current flow generate transient fault currents in diode wheel 4 that are high-frequency AC.

These AC fault currents create an inductive reactance in the highly magnetic material of the diode wheel 4, which as noted previously is acting as the field current conductor. Because of these inductive backvoltages which retard sudden distributions of current in the magnetic steel diode wheel 4, diode fuse-legs (comprising a diode assembly 6 or 8 and a diode fuse 10 or 12) located farther away from the faulted diode assembly 6 or 8 experience less intense surges than those nearer the fault. This effect is only significant on design which utilize phase paralleling rings between the diode modules and the armature winding. This current imbalance may result in a single diode fuse 10 or 12 adjacent to the failed diode instantaneously carrying nearly 50% of the total fault current. Thus, the AC fault currents will no longer distribute evenly per the balanced DC current paths which are axial, but will instead distribute per the unbalanced high frequency AC current paths, which are circumferential. Further, instantaneous high-frequency current components transmitted to the diode wheel 4 at the instant of failure tend to flow on the surface of the diode wheel 4 rather than being distributed uniformly throughout its thickness. This phenomenon adds uncertainty to transient current flows that are already difficult to analyze.

The current flow asymmetry which has been discussed affects proper operation of diode fuses 10 and 12, in some cases causing the diode fuse 10 or 12 associated with the failed diode assembly 6 or 8 to operate more slowly, and in other cases causing the diode fuses 10 or 12 of nearby unfailed diodes to operate spuriously. When a large percentage of the total fault current is conducted through a single diode fuse 10 or 12, the fuse may blow. A "cascade failure" of the diode fuses 10 or 12 may result if the number of remaining fuses is less than the minimum amount required to carry the maximum field current.

Figure 3:
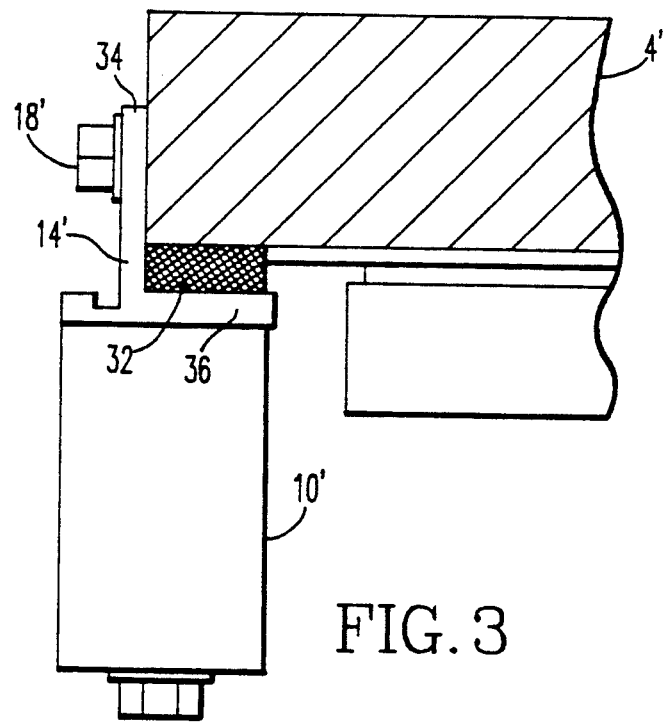
FIG. 3 is a partial sectional view of the assembly diagram of FIG. 2 showing the cross-section of the installed stranded conductor of the present invention.
Figure 2:
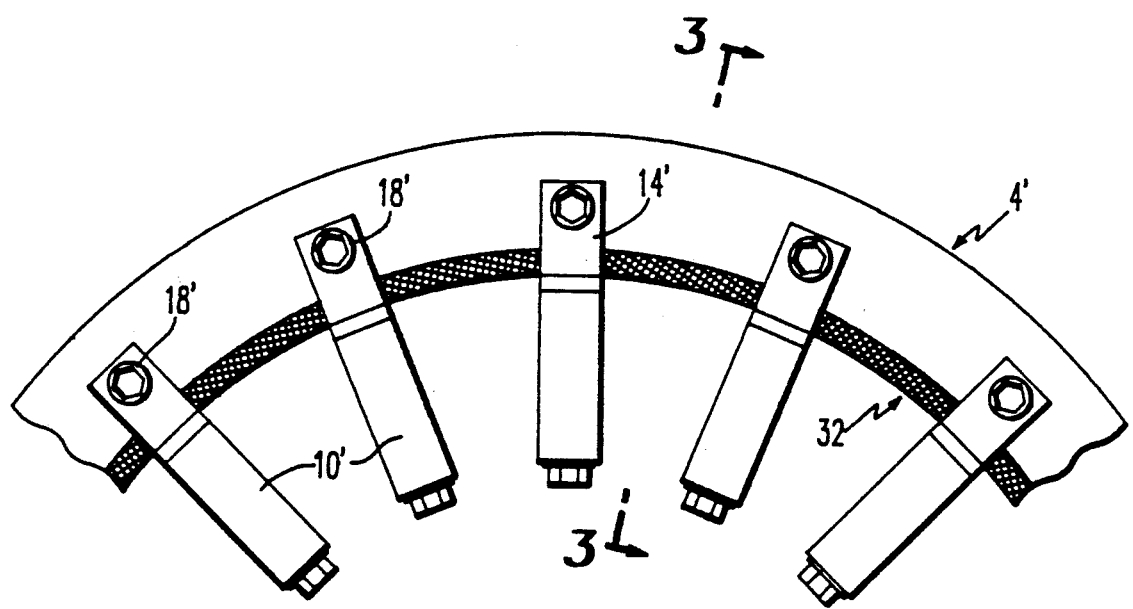
FIG. 2 is a partial assembly diagram showing the attachment of the stranded conductor of the present invention to a brushless exciter rotor.

The present invention solves this problem by providing a means for carrying fault currents more efficiently about the periphery of the diode wheel 4 so that upon a failure of a diode assembly 6 or 8, the resulting high frequency AC fault currents are more quickly equalized among the fuse-legs of the same phase. FIGS. 2 and 3 show a preferred embodiment of the present invention. In FIGS. 2 and 3, components with like names and functions to the components described in FIG. 1 are designated with the same numbers and also using the prime symbol, so that, for example, a diode wheel 4' is provided in the present invention, the diode wheel 4' being in most respects similar to the diode wheel 4 known in the prior art.

Referring now to FIG. 2, there is provided a copper stranded conductor 32 formed in a generally circular ring shape and attached peripherally about the diode wheel 4'. In this first preferred embodiment, the conductor 32 is attached to the inner perimeter of the diode wheel 4' at the edge of diode wheel 4' so as to carry fault currents about the periphery of diode wheel 4'. In the event of a diode fault, the high frequency fault currents will flow through the low impedance copper conductor more easily than through the steel diode wheel. This auxiliary current path in the peripheral, as opposed to axial, direction relative to the cylindrical diode wheel 4' carries fault currents and tends to equalize the fault currents among the diode fuses 10' which are associated with the same phase of the machine.

FIG. 3 is a partial cross-sectional view of the diode wheel 4' of FIG. 2 showing this first preferred installation of the conductor 32. As can be seen in the drawing figure, conductor 32 is located on the inner perimeter of diode wheel 4' flush with the end edge of diode wheel 4'. An extended fuse base 14' is provided for mechanically holding the conductor 32 in electrical connection with the diode wheel 4'. The extended fuse base 14' is comprised of first and second portions 34 and 36 joined at right angles. The first portion 34 of extended fuse base 14' has a hole to accommodate fuse attachment bolt 18', and the inner side of this portion is mounted in electrical contact with the diode wheel 4'. The second portion 36 of extended fuse base 14' is connected on its outer side to the diode fuse 10' and is held in electrical connection with the conductor 32 on its inner side. The extended fuse base 14' differs in significant regard from the prior-art fuse base 14 (shown in FIG. 1) in that the first portion 34 is lengthened to accommodate the conductor 32 which is placed between the extended fuse base 14' and the diode wheel 4'. If desired, additional means may be provided to ensure a good electrical path between each diode fuse 10' and the conductor 32, such as additional fasteners, welding or soldering, coatings, etc.

Figure 4:
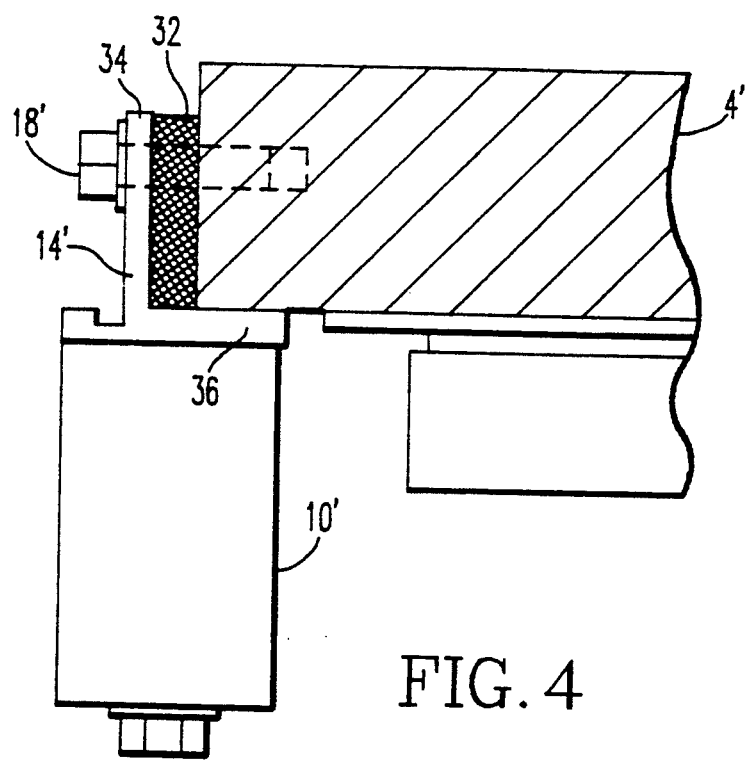
FIG. 4 is a partial sectional view of an alternative preferred installation of the conductor of the present invention.

A second preferred option for installation of the conductor 32 is illustrated in FIG. 4. In this embodiment, conductor 32 is mounted on the end edge of diode wheel 4' between first portion 34 of diode fuse base 14' and the diode wheel 4'. The fuse attachment bolt 18' passes through a hole in conductor 32 to fix both the diode fuse 10' (including diode fuse base 14') and the conductor 32 firmly to the diode wheel 4'. Rather than first portion 34 of diode fuse base 14' being extended to accommodate conductor 32, the second portion 36 of diode fuse base 14' is extended in this embodiment.

It should be noted that the preferred embodiments of FIGS. 2, 3, and 4 are merely illustrative and that, as long as the necessary electrical connections between conductor 32 and diode fuse bases 14' are made, the conductor 32 can be attached in any position in the specified region, such as about the outside perimeter of the cylindrical diode wheel 4'. It is believed desirable for structural support and ease of assembly to incorporate means for attaching conductor 32 to the diode wheel 4' into diode fuse base 14', but those skilled in the art will recognize that attaching means not associated with the diode fuse base 14' could be used.

In any of the embodiments, the conductor 32 might be a solid block conductor, but a stranded conductor is preferred for its increased surface area which decreases high-frequency impedance. Copper is preferred for its properties of low impedance and low cost. The choice of a stranded copper conductor ensures that the high-frequency impedance of the conductor 32 will be lower than the high-frequency impedance of the magnetic steel diode wheel 4. It is desirable that the high-frequency impedance of the conductor 32 be lower than the high-frequency impedance of diode wheel 4 so that, upon failure of a diode assembly 6 or 8 (shown in FIG. 1) AC fault currents will follow a path within the conductor 32 rather than being transmitted to the diode wheel 4 where they would generate significantly larger inductive reactances. Also, although in the embodiment disclosed a single conductor 32 is provided, any desired number of conductors 32 could be installed. For example, there might be a separate conductor 32 provided for each phase of the machine, with the fuse legs associated with each phase all connected together by means of the associated conductor 32. To minimize weight and structural complexity, the embodiment having a single conductor 32 for an end of the diode wheel 4' is preferred. Finally, although a conductor 32 has been specified herein at only one end of the diode wheel 4', it may also be desirable to install another such conductor 32 at the other end of the diode wheel 4', to be installed in similar fashion between diode fuse base 16 and fuse mounting block 22 (shown in FIG. 1).

In the method of the present invention, it is first necessary to predict the magnitude of the fault currents expected, and the conductor 32 should then be sized to carry the expected short-term fault currents. In a typical machine, such instantaneous high-frequency fault currents might be in the range of 10,000 to 40,000 Amperes. The conductor 32 should not, however, be made so large that it produces an imbalance under normal DC operation. Depending on the size (and therefore weight) of the conductor 32 selected and the mechanical structure of diode wheel 4', mechanical strengthening of the diode wheel 4' might be necessary. The conductor or conductors 32 are then constructed and installed on the diode wheel 4' according to the procedure outlined above.

As those skilled in the art will appreciate, the present invention provides a number of benefits. First, the invention increases reliability of a machine on which it is installed by preventing cascade diode fuse failures, thus decreasing the forced outage rate of the brushless exciter. Second, by promoting more uniform fault current distribution in the brushless exciter, the present invention provides a brushless exciter that behaves in a more predictable manner. Unpredictable conditions can be eliminated so that failures due to unexpected interactions can be prevented. Finally, the present invention helps assure that diode fuse protection will operate as designed and permits sizing of diode fuses according to the desired current carrying capacity rather than to accommodate transient fault currents.

I claim:

1. A structure for connecting a plurality of machine current conductors to a rotating cylindrical current conductor in an electrical machine, comprising:
   1) mechanical connection means for attaching the machine current conductors in spaced relationship about the circumference of the cylindrical current conductor such that a terminal of each machine current conductor may be placed in electrical connection with the cylindrical current conductor;
   2) peripheral conductor means connected to the machine current conductors for providing a peripheral electrical conduction path between machine current conductors spaced about the circumference of the cylindrical current conductor, wherein the peripheral conductor means has impedance lower than the impedance of the cylindrical current conductor with respect to transient currents.

2. The structure of claim 1 wherein the peripheral conductor means is a generally ring-shaped circular conductor.

3. The structure of claim 2 wherein all of the machine current conductors connected to an end of the cylindrical current conductor are also connected to the circular conductor.

4. The structure of claim 1 wherein the peripheral conductor means is constructed with a conductive surface area greater than that of a solid block conductor.

5. The structure of claim 4 wherein the peripheral conductor means is a stranded conductor.

6. The structure of claim 4 wherein the peripheral conductor means is comprised of a plurality of copper conductors.

7. A structure for connecting a plurality of diode fuses to a cylindrical diode wheel, comprising:
   1) mechanical connection means for attaching the diode fuses in spaced relationship about the circumference of the diode wheel such that a terminal of each diode fuse may be placed in electrical connection with the diode wheel;
   2) conductor means connected to the diode fuses for providing a peripheral electrical conduction path between diodes spaced about the circumference of the diode wheel, wherein the conductor means has impedance lower than the impedance of the diode wheel with respect to transient alternating current.

8. The structure of claim 7 wherein the conductor means is a ring-shaped conductor.

9. The structure of claim 8 wherein all of the diode fuses connected to an end of the diode wheel are also connected to the ring-shaped conductor.

10. The structure of claim 7 wherein the conductor means is constructed with a conductive surface area greater than that of a solid block conductor.

11. The structure of claim 10 wherein the conductor means is a stranded conductor.

12. The structure of claim 10 wherein the conductor means is comprised of a plurality of copper conductors.

13. A brushless exciter diode wheel for an electrical machine, comprising:
   1) cylinder means for conducting current to a field coil of the machine;
   2) a plurality of diode means for providing a current output for transmission to the cylinder means;
   3) a plurality of diode fuse means, each having an input connected to the output of at least one of the diode means and an output at the cylinder means and connected therebetween for transmitting current from the diode means to the cylinder means during normal operation and for selectively interrupting said current transmission from the diode means to the cylinder means upon a failure of the diode means;
   4) circular conductor means connected to the outputs of a plurality of the diode fuse means for carrying fault currents in a direction about the circumference of the cylinder means.

14. The wheel of claim 13 wherein all of the diode fuse means connected to an end of the cylinder means are also connected to the circular conductor means.

15. The wheel of claim 13 wherein the circular conductor means is constructed with a conductive surface area greater than that of a solid block conductor.

16. The wheel of claim 15 wherein the conductor means is a stranded conductor.

17. The wheel of claim 15 wherein the conductor means is comprised of a plurality of copper conductors.

18. A brushless exciter diode wheel for an electrical machine, comprising:
   1) rotating cylinder means for conducting current through a generally cylindrical conductor to another portion of the machine;
   2) a plurality of diode unit means mounted on the cylinder means in electrical connection therewith for providing a current output to the cylinder means and having associated therewith base means for mounting at least a portion of the diode unit means to the cylinder means;
   3) circular conductor means mounted in electrical connection with the cylinder means and with the diode unit means for carrying fault currents in a direction about the circumference of the cylinder means.

19. The wheel of claim 18 wherein the diode unit means include rectification means for rectifying current and diode fuse means for selectively interrupting the current output to the cylinder means upon a failure of the diode unit means.

20. The wheel of claim 19 wherein the diode fuse means are mounted on the base means and are connected thereby to the cylinder means.

21. The wheel of claim 20 wherein the base means includes one or more bases having, in cross section, first and second portions meeting at approximately a right angle, said portions having an inside side included in the nearly right angle and outside side not included in the nearly right angle, with the first portion mounted at its inside side to the cylinder means, the second portion mounted at its outside side to the diode fuse means, wherein the circular conductor means is disposed at the inside side of the second portion and is held at that position in electrical connection with both the diode fuse means and the cylinder means.

22. The wheel of claim 21 wherein the circular conductor means is connected by the one or more bases, to all of the diode fuse means which are connected to an end of the cylinder means.

23. The wheel of claim 21 wherein the circular conductor means is constructed with a conductive surface area greater than that of a solid block conductor.

24. The wheel of claim 23 wherein the circular conductor means is a stranded conductor.

25. The wheel of claim 23 wherein the circular conductor means is comprised of a plurality of copper conductors.

26. The wheel of claim 20 wherein the base means includes one or more bases having, in cross section, first and second portions meeting at approximately a right angle, said portions having an inside side included in the nearly right angle and outside side not included in the nearly right angle, with the first portion mounted at its inside side to the cylinder means, the second portion mounted at its outside side to the diode fuse means, wherein the circular conductor means is disposed at the inside side of the first portion and is held at that position in electrical connection with both the diode fuse means and the cylinder means.

27. The wheel of claim 26 wherein the circular conductor means is connected by the one or more bases to all of the diode fuse means which are connected to an end of the cylinder means.

28. The wheel of claim 26 wherein the circular conductor means is constructed with a conductive surface area greater than that of a solid block conductor.

29. The wheel of claim 28 wherein the circular conductor means is a stranded conductor.

30. The wheel of claim 28 wherein the circular conductor means is comprised of a plurality of copper conductors.

* * * * *